(No Model.)

E. W. WICKEY.
METHOD OF MANUFACTURING METAL WHEELS.

No. 451,545. Patented May 5, 1891.

Witnesses:
Charles Shevey
Syrred Lindren

Inventor:
Edward W. Wickey,
By his atty's Wills Mane & Bitner

United States Patent Office.

EDWARD W. WICKEY, OF CHICAGO, ILLINOIS.

METHOD OF MANUFACTURING METAL WHEELS.

SPECIFICATION forming part of Letters Patent No. 451,545, dated May 5, 1891.

Application filed September 1, 1890. Serial No. 363,630. (No specimens.)

*To all whom it may concern:*

Be it known that I, EDWARD W. WICKEY, a citizen of the United States of America, residing at Chicago, in the county of Cook and State of Illinois, have invented certain new and useful Improvements in a Method of Constructing Metal Wheels, of which the following is a description.

My invention relates particularly to an improved method for securing the spokes of a metal wheel in the hub, and said improvements are illustrated by means of the drawings presented herewith, comprising three figures, of which—

Figure 1:
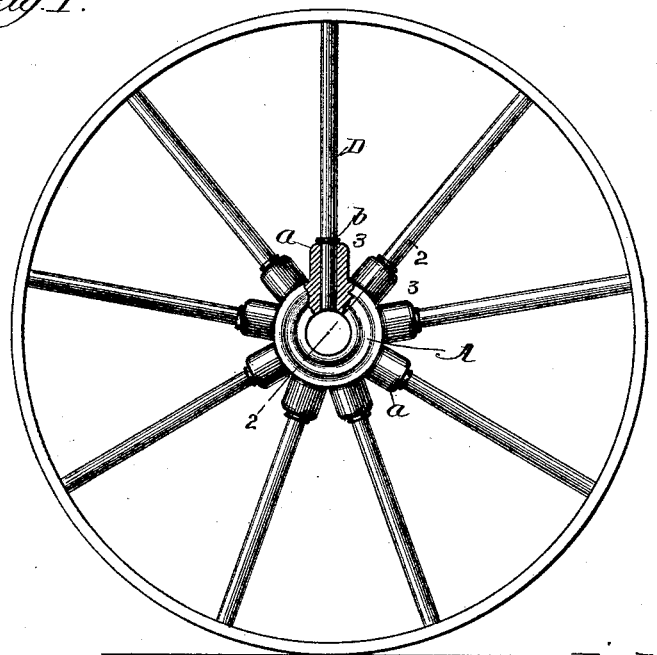
Figures 2, 3:
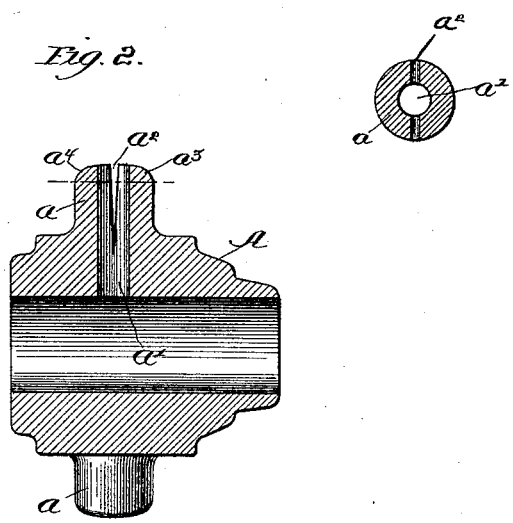

Figure 1 is a side view of a complete wheel with portions shown in section. Fig. 2 is an axial section of the hub of said wheel in line 2 2 of Fig. 1, and Fig. 3 is a cross-section in line 3 3 of Fig. 1.

The object of my invention, in common with many others, is to devise a way of uniting a wrought-metal spoke with a cast-metal hub so that when finished the two will be practically integral; and to such end it consists in the different features below described and claimed.

Describing the preferred details of my improved method from the drawings, I cast a hub A of some metal suitable for welding and bearing about its periphery near the central portion a series of radially-projecting bosses or studs $a$. Each of these studs is cored to leave a central hole or recess $a'$ to receive the spoke, and a slot $a^2$ extending in a plane normal to the axis of the wheel and dividing each one of the studs into two halves $a^3$ $a^4$. I then cut a wrought-metal spoke B to the proper length, and preferably upset it to form an enlargement or encircling rib $b$, after which I drive it into the hole $a'$, which it fits tightly. The enlargement $b$ serves to limit the insertion of the spoke into the hub. This may, if preferred, be done by allowing the hole $a'$ to extend only part way through the body of the hub. It is, I believe, however, best to allow the spoke to extend nearly, if not quite, to the interior of the hub. After all the spokes are in position in the hub the latter is placed in a suitable welding-machine, adapted while holding it firmly to exert great force in the direction which will press the two portions of the bosses $a$ toward each other and at the same time subject them to a welding heat. The slots $a^2$ allow the two portions to approach each other enough to make a perfect weld with the spokes, and said slots are preferably made just wide enough to be closed by the operation of welding and the two portions of the studs themselves united into a solid and continuous piece of metal. To insure perfect union, I prefer to make these slots V-shaped in section, as shown in Figs. 2 and 3, although said form is not essential to my invention, broadly considered; but in crowding the parts together to weld them the sides of the slots are brought together more easily and more quickly at the outer ends than near the hub. I prefer to make the studs $a$ separate, except where they unite with the body of the hub, as it enables me to clamp them more firmly and gain a perfect union with the spoke in welding. If, however, it should be desired, these studs may extend either on one or both sides of the spokes and form a continuous flange around the hub without departing from the main features of my invention; also, it is not absolutely necessary that the slots $a^2$ should divide the studs $a$ entirely into two portions. The only purpose of these slots is to allow the two side portions to approach each other enough to gain a perfect weld with the spokes, and this may be accomplished by weakening the studs at substantially the same place where the slots are shown. This I should consider, as far as the main purpose is concerned, the equivalent of the slots.

I claim as new and desire to secure by Letters Patent—

1. The method of constructing metal wheels, which consists in forming the hub with a series of radially-projecting bosses having holes to receive the spokes and weakened in a plane substantially central thereto and normal to the axis of the wheel, inserting the spokes in said holes, and then subjecting the bosses to a welding-heat, and at the same time applying pressure in the proper direction to solidly unite the bosses and the spokes into a single piece, substantially as described.

2. The method of constructing metal wheels, which consists in forming the hub with a series of radially-projecting bosses having holes to receive the spokes, slotted in a plane substantially central to said bosses, inserting the spokes in said bosses, then subjecting both to a welding heat, at the same time applying pressure in the proper direction to unite them solidly into a single piece, substantially as described.

3. The method of constructing metal wheels, which consists in forming the hub with a series of radially-projecting bosses having holes to receive the spokes, slotted in a plane substantially central to said bosses, inserting the spokes in the latter, and then subjecting both to a welding heat, at the same time applying pressure in the proper direction to unite the divided parts of said bosses and also the spokes solidly together, substantially as described.

4. The method of constructing a metal wheel, which consists in forming the hub with a series of radially-projecting bosses divided into two parts by V-shaped slots in a plane substantially central to said bosses, inserting the spokes in said bosses, and then subjecting both to a welding heat, at the same time applying pressure in the proper direction to unite the spokes with the bosses and the sides of the slots in the latter with each other, substantially as described.

EDWARD W. WICKEY.

Witnesses:
K. M. TURNER,
A. M. BUSH.